United States Patent [19]

Madonna et al.

[11] Patent Number: 5,349,579
[45] Date of Patent: Sep. 20, 1994

[54] TELECOMMUNICATION SWITCH WITH PROGRAMMABLE COMMUNICATIONS SERVICES

[75] Inventors: Robert P. Madonna, W. Barnstable; Kevin C. Kicklighter, Hyannis, both of Mass.

[73] Assignee: Excel, Inc., Sagamore Beach, Mass.

[21] Appl. No.: 1,113

[22] Filed: Jan. 5, 1993

[51] Int. Cl.$^5$ .................. H04L 12/52; H04Q 11/04
[52] U.S. Cl. ................................ 370/58.2; 370/67
[58] Field of Search ............... 370/66, 67, 68, 85.1, 370/85.9, 85.11, 60, 60.1, 94.1, 94.2, 58.2, 58.1, 58.3

[56] References Cited

U.S. PATENT DOCUMENTS

| 4,736,409 | 4/1988 | Hasegawa et al. | 370/67 |
| 4,787,081 | 11/1988 | Waters et al. | 370/67 |
| 4,975,903 | 12/1990 | Wakerly et al. | 370/67 |
| 5,202,883 | 4/1993 | Hatherill et al. | 370/67 |

FOREIGN PATENT DOCUMENTS

| 0192894 | 9/1986 | European Pat. Off. . |
| 0261790 | 3/1988 | European Pat. Off. . |
| 0350402 | 1/1990 | European Pat. Off. . |
| 0358597 | 3/1990 | European Pat. Off. . |
| 3534918 | 9/1985 | Fed. Rep. of Germany . |
| 4101885 | 1/1991 | Fed. Rep. of Germany . |
| 2172173 | 9/1985 | United Kingdom . |

Primary Examiner—Wellington Chin
Attorney, Agent, or Firm—Cesari and McKenna

[57] ABSTRACT

A telecommunications switch which may be configured to provide a variety of user-programmable communications or call processing services. Such services may be dynamically provided to any port served by the switch without reducing the number of time slots that would otherwise be available for calls. The switch includes a CPU/matrix card, one or more line cards for terminating analog or digital lines or trunks, and one or more programmable communications services cards, all of which are connected in communicating relationship by a series of buses. Each communications services card is independently programmable and includes a processor for processing messages received from the CPU/matrix card. The communications services card provides a basic platform onto which different types of modules may be mounted to meet the requirements of a particular application. One or more digital signal processing modules for performing tone generation, tone reception and call progress analysis may be mounted on a single communications services card. An ISDN PRI server module provides a centralized packet engine which, when programmed in an appropriate fashion, may be used as an ISDN D channel server or to provide packet switching services. Modules for performing other services such as speech recognition, ADPCM compression or tone generation may also be installed on the basic platform.

45 Claims, 7 Drawing Sheets

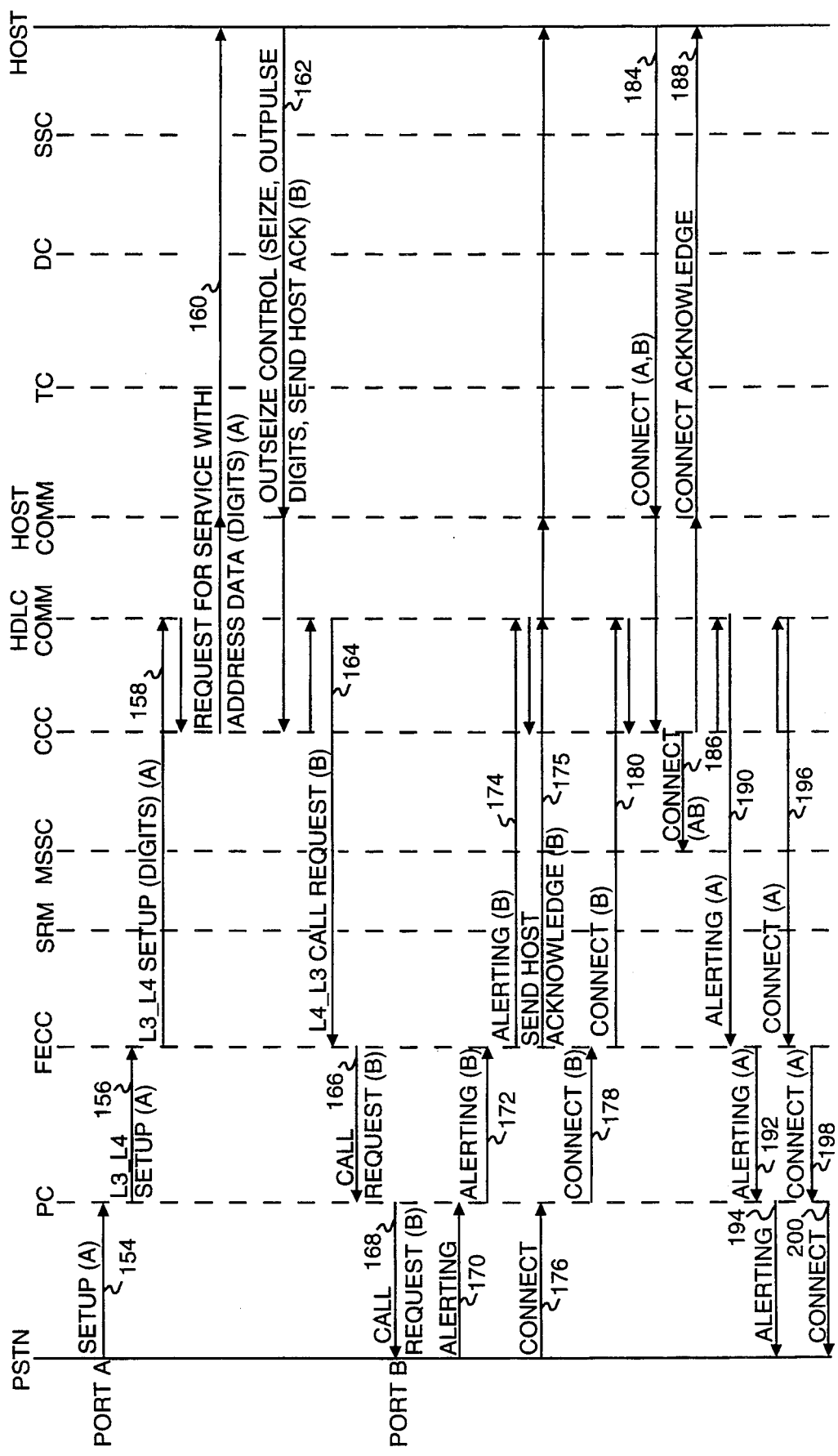

TELECOMMUNICATION SWITCH WITH PROGRAMMABLE COMMUNICATIONS SERVICES

BACKGROUND OF THE INVENTION

1. Field of the Invention

The present invention relates generally to the field of telecommunications and, more specifically, to a programmable telecommunication switch having programmable cards which may provide desired call processing or communications services to any port in the switch.

2. Discussion of the Prior Art

Many conventional digital telecommunications switches employ a time slot interchange (TSI) to effect switching using time division multiplexing (TDM) techniques. A classical TSI consists of a memory for storing digital information (voice, data, etc.), a counter and a control store. The counter cyclically generates consecutive addresses which are applied to the memory. As each such address is applied for a predetermined period of time known as a "time slot," incoming digital information is stored in (written to) the memory location corresponding to that address. In general, each time slot corresponds to a unique "port" of the switch. Each port represents a possible connection for a telephone line, trunk or other device.

The switching function is effected by the control store, which generates addresses simultaneously with the counter. However, these addresses, the order of which may be dynamically changed, are generally not consecutive. Thus, as these reordered addresses are applied to the memory during a read mode of operation, the effect is to switch or interchange the order in which the previously stored information is retrieved from the memory. In this fashion, information which is received by the memory from any given port during a particular time slot may be transmitted via the memory to any other port during another time slot.

In addition to the basic time switching function just described, many digital telecommunications switches are also required to provide communications or call processing services. Such services typically include tone generation and tone detection, but may also include more sophisticated services to meet the requirements of a particular application.

A conventional technique for providing call processing services is to configure a switch with the necessary circuitry (e.g., one or more tone generators and one or more tone receivers of the appropriate protocols) and use the TSI to establish communication paths between such circuitry and the appropriate ports. For example, assume that a user lifts her handset and the switch detects that her line is now off-hook. The switch may respond by establishing a communication path through the TSI between an available tone generator and the off-hook line. Consequently, a dial tone produced by the tone generator is heard by the user.

There are, however, significant disadvantages to this conventional technique. First, since some of the TSI's time slots must be assigned to provide desired services, this reduces the number of time slots available for actual calls, thus reducing the call-handling capacity of the switch. This reduction may represent a significant percentage of maximum capacity depending upon the particular application and the attendant need for communications or call processing services. In addition, the time required by the switch to provide a given service to a given port may be increased due to blocking.

This problem is not necessarily satisfactorily addressed by merely constructing a larger TSI having more time slots. There are physical limitations on the maximum size of a TSI, including the amount of space needed to physically terminate the lines and trunks, the TSI's memory size and speed, the sheer complexity of the TSI and the minimum switching speed which must be maintained to meet the specifications of typical applications.

Second, there is the problem of deciding the appropriate amounts and types of circuitry to use for a particular application. That is, a decision must be made as to how many DTMF tone generators to include, how many MFR1 generators, how many MFR2 generators, etc. The same considerations also apply for tone reception and other desired services. Obviously, the choice to include more or a larger variety of circuitry involves a corresponding tradeoff of maximum call-handling capacity, since each additional tone generator or receiver, for example, would require allocation of its own time slot.

A third disadvantage is a lack of flexibility and programmability. Generally, once the initial decisions are made and particular circuitry is installed in the switch, there is no way to dynamically alter that circuitry or the services provided thereby. Thus, if a customer needed to decrease the number of MFR1 tone receivers and increase the number of DTMF tone receivers due to changing demands in the traffic handled by the switch, he or the vendor would generally have to physically change the hardware. This represents a costly and inefficient solution which may require that the switch be taken out of service for a period of time.

SUMMARY OF THE INVENTION

In brief summary, the present invention provides a telecommunications switch which may be configured to provide a variety of user-programmable communications or call processing services. Such services may be dynamically provided to any port served by the switch without reducing the number of time slots that would otherwise be available for calls.

The switch includes a CPU/matrix card, one or more line cards for terminating analog or digital lines or trunks, and one or more programmable communications services cards, all of which are connected in communicating relationship by a series of buses.

The CPU/matrix card includes a single TSI, whose time slots correspond to the ports of the switch, and a central call processor for both processing messages received from a host and for controlling the line cards and communications services cards.

Each communications services card is independently programmable and includes a processor for processing messages received from the CPU/matrix card.

The communications services card provides a basic platform onto which different types of modules may be installed to meet the requirements of a particular application. One or more digital signal processing modules may be programmed to perform tone generation, tone reception, call progress analysis, voice recognition, voice compression or fax encoding/decoding and may be mounted on a single communications services card. Similarly, a voice recorded announcement module may be mounted on the basic platform to permit a user to download one or more voice announcements from a host for playback to any port in the switch. If desired, one or more digital signal processing modules and a voice recorded announcement module may be mounted on a single communications services card. An ISDN PRI server module provides full ISDN primary rate capability. The ISDN PRI server module, in conjunction with other cards in the switch, may also perform transparent conversion between common channel and robbed bit signalling protocols. Modules for performing other services such as speech recognition, ADPCM compression or tone generation may also be installed on the basic platform.

A high speed data link control (HDLC) bus, a TDM bus, a line card status/control bus and a timing/control bus interconnect the CPU/matrix card with the line cards and the communications services cards. The HDLC bus is used to pass messages bidirectionally between the CPU/matrix card and the digital line cards and between the CPU/matrix card and the communications services cards. The TDM bus is used to pass pulse coded modulation (PCM) information bidirectionally between the CPU/matrix card, the line cards and the communications services cards. The line card status/control bus or HDLC bus is used by the CPU/matrix card to interrogate the line cards, both digital and analog, and the communications services cards in order to identify the type of each card. The timing/control bus is used to supply synchronization signals from the CPU/matrix card to the line cards and the communications services cards.

The CPU/matrix card and communications services cards are connected to the TDM bus such that all such cards continuously receive all PCM information transmitted from all line cards during all time slots. However, during any given time slot, one and only one of the CPU/matrix card or available communications cards is permitted to transmit PCM information to the line card having the port associated with that given time slot. Thus, for any given time slot, the PCM information that is transmitted to the corresponding port will originate from either the TSI on the CPU/matrix card or one of the communications services cards. As a result of this arrangement, the communications services cards are able to transmit PCM information directly to the line cards (ports) via the TDM bus without occupying time slots that would otherwise be available for other calls.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 7 is a call flow diagram showing the messages generated and tasks performed when the packet engine card of FIG. 6 processes calls.

DETAILED DESCRIPTION OF AN ILLUSTRATIVE EMBODIMENT

Figure 1:
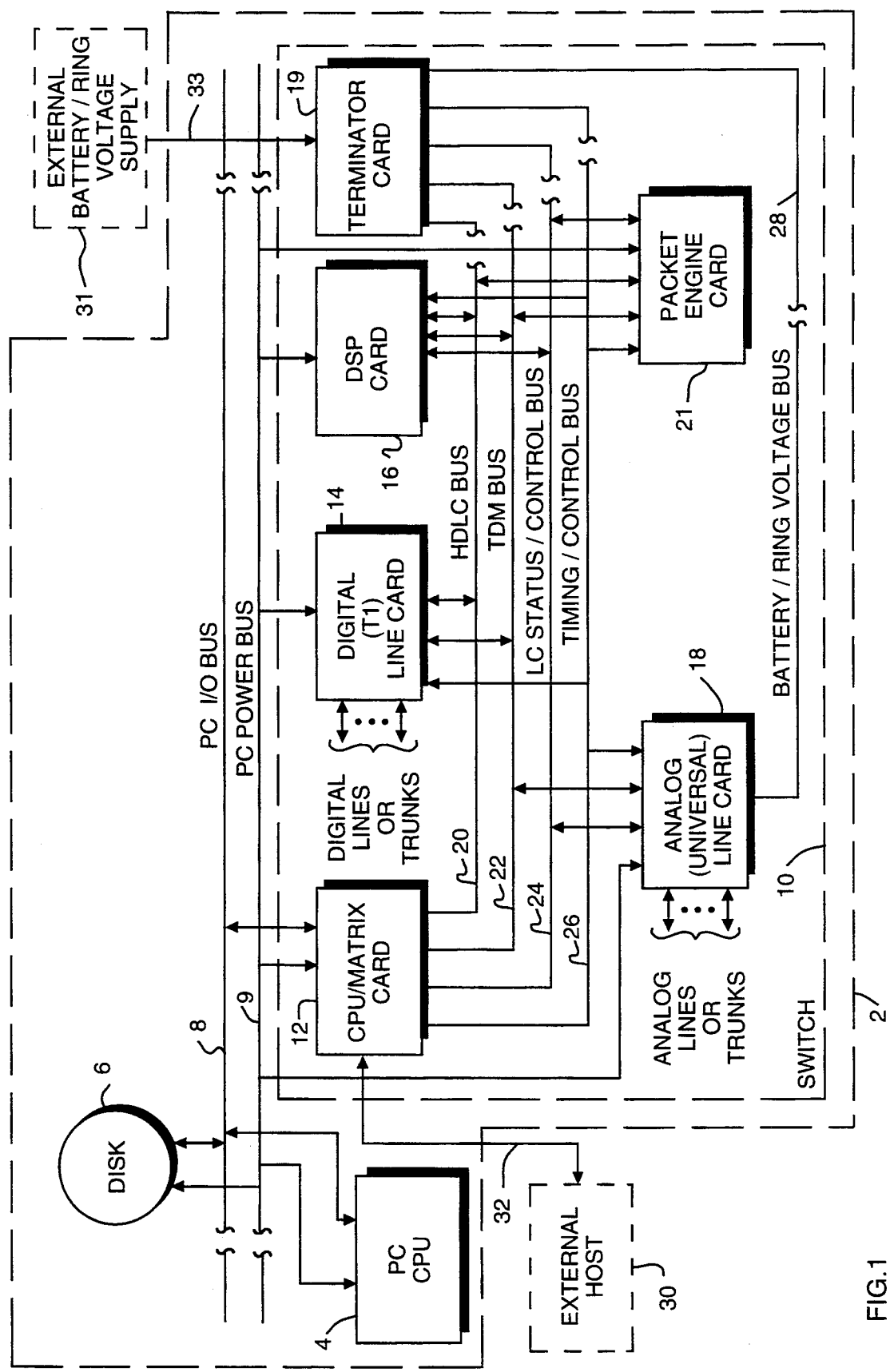
FIG. 1 is a block diagram of a programmable telecommunications switch which resides in a personal computer and which includes programmable communications services cards constructed in accordance with a preferred embodiment of the present invention.

FIG. 1 shows a commercially available personal computer (PC) 2 which includes a PC central processing unit (CPU) 4 and a hard disk drive 6 interconnected by a PC input/output (I/O) bus 8 and a PC power bus 9. The PC 2 is preferably a PC-AT, sold by International Business Machines, or a compatible thereof. Other personal computers having more memory or more powerful CPUs than the PC-AT may also be used. The PC 2 preferably operates under an application-oriented operating system, such as DOS or UNIX.

The PC 2 consists of a chassis or housing in which a motherboard is mounted, along with the disk drive 6 and other optional assemblies such as floppy disk drives, modems and the like. The PC CPU 4 is mounted on the motherboard, which includes a series of "slots" into which other boards (cards) may be inserted and thereby connected to the PC I/O and power busses 8 and 9.

A programmable telecommunication switch 10 resides within the PC 2. A CPU/matrix card 12 is inserted into one of the slots on the motherboard and thus connected to the busses 8 and 9. The CPU/matrix card 12 is interconnected with a digital (T1) line card 14, a digital signal processing (DSP) card 16 and an analog (universal) line card 18, a terminator card 19 and a packet engine card 21 by four buses: a high speed data link control (HDLC) bus 20; a TDM bus 22; a line card (LC) status/control bus 24; and a timing/control bus 26. A battery/ring voltage bus 28 supplies battery voltage (48VDC) and ringing voltage (109VAC) to the analog line card 18. The terminator card 19 serves to physically terminate busses 20, 22, 24, 26 and 28.

The line cards 14 and 18, the DSP card 16 and the packet engine card 21 are all connected to and receive their basic operating power from the PC power bus 9. Although only one digital line card 14 and one analog line card 18 are depicted, it should be understood that additional line cards of either type may be added subject to two physical limitations: (1) the maximum switching capacity of the CPU/matrix card 12, and (2) the physical space within the chassis of the PC 2. Similarly, additional DSP cards 16 or packet engine cards 21 may be added subject to physical space limitations.

An external host 30, which may comprise a separate personal computer, workstation or other computer, may optionally be connected via a communication channel 32 to the CPU/matrix card 12. The CPU/matrix card 12 preferably includes a conventional RS-232 compatible interface for connecting to the channel 32. The external host 30 preferably operates under an application-oriented operating system.

If desired, the switch 10 can reside on a passive backplane (no PC CPU 4 or disk 6 present) from which it receives electrical power and be controlled by the external host 30.

An external battery/ring voltage supply 31 is connected via a path 33 to the terminator card 19. Supply 31 may comprise, for example, a commercially available power supply.

Figure 2:
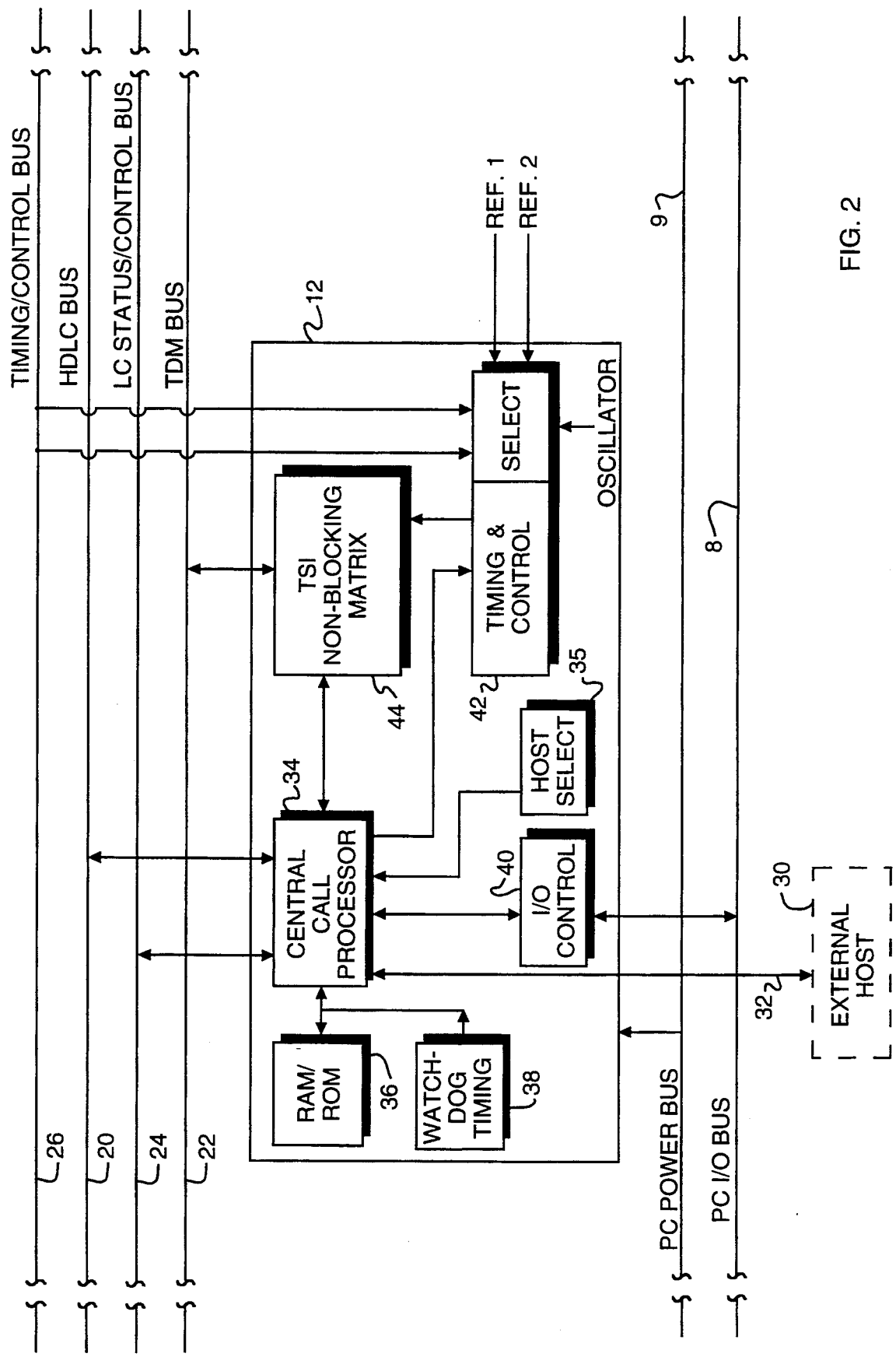
FIG. 2 is a detailed diagram of the CPU/matrix card of FIG. 1.

FIG. 2 shows the CPU/matrix card 12 in greater detail. A central call processor 34 is connected to both the HDLC bus 20 and the LC status/control bus 24. The central call processor 34 is also connected with host select circuitry 35, random access and read only memories 36, watchdog timing circuitry 38, input/output (I/O) control circuitry 40, timing and control/select circuitry 42 and a time slot interchange (TSI) 44. Timing and control/select circuitry 42 is connected to the TSI 44, the timing/control bus 26 (for loop timing) and to three sources of timing signals, which are denoted REF 1, REF 2 (which may be supplied by external sources for reference timing) and OSCILLATOR (which may be supplied by a free running oscillator located on the CPU/matrix card 12), respectively.

The central call processor 34, which is preferably a Motorola 68302 microprocessor, has control over all of the other circuitry on the CPU/matrix card 12. The central call processor 34 preferably runs under a real time operating system such as pSOS, sold by Integrated Systems, and preferably uses Q.931-like messages, a CCITT standard protocol, for communicating over the HDLC bus 20. Using the HDLC bus 20, the central call processor 34 may transmit a message simultaneously to all cards connected to that bus. The processor 34 may use the LC status/control bus 24 to select a particular card to transmit a message over the HDLC bus 20.

The host select circuitry 35, which is preferably a switch, operates to inform the processor 34 whether to communicate with the internal host or the external host upon power-up.

I/O control circuitry 40, which manages all communication between the central call processor 34 and the internal host, preferably appears as a COMM port or other standard PC I/O port on the PC I/O bus 8.

Timing and control/select circuitry 42, as described further below, operates in response to instructions from the central call processor 34 to select one of five available signals for synchronizing the CPU/matrix card 12. Two such signals are provided by the timing/control bus 26, the other three being REF 1, REF 2 and OSCILLATOR.

TSI 44, which is preferably a non-blocking matrix, receives incoming PCM data via the TDM bus 22 and operates, as directed by the central call processor 34, to interchange time slots in a conventional manner.

Figure 3:
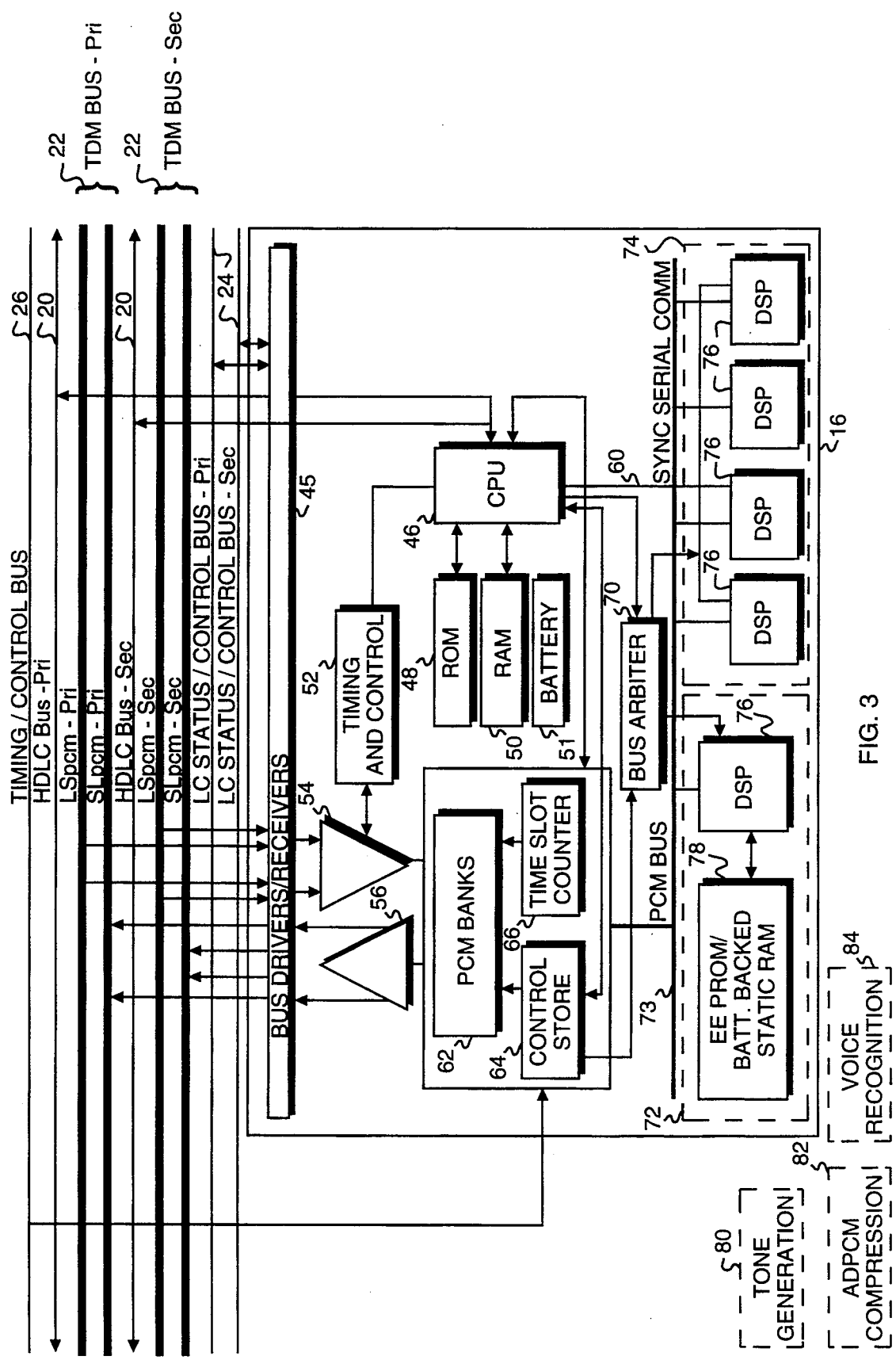
FIG. 3 is a detailed diagram of the digital signal processing card of FIG. 1.

FIG. 3 shows in greater detail the DSP card 16 of FIG. 1. A series of bus drivers/receivers 45 interface with the HDLC bus 20, the TDM bus 22 and the LC status/control bus 24. PC power bus 9 is omitted for clarity. The bus drivers/receivers 45 are preferably of a type having open collector outputs. This is preferable since the DSP card 16 shares the TDM bus 22 with the CPU/matrix card 12, the digital line card 14 and the packet engine card 21. Thus, use of drivers/receivers 45 having open collector outputs permits the appropriate cards to be connected directly to bus 22.

Some or all of buses 20, 22 and 24 may be duplicated for the purpose of providing redundancy. In this figure, the primary bus is denoted by the suffix "Pri" and the secondary bus by the suffix "Sec".

Each TDM bus 22 provides two communication paths designated "LSpcm" and "SLpcm". The LSpcm path carries PCM information from the line cards 14 and 18 to the CPU/matrix card 12, the DSP card 16 and the packet engine card 21. Conversely, the SLpcm path carries PCM information from the CPU/matrix card 12, the DSP card 16 and the packet engine card 21 to the line cards 14 and 18. In a preferred embodiment, two eight bit parallel buses are used for the LSpcm and SLpcm paths, respectively. Alternatively, those paths may be provided by a plurality of multiplexed serial buses, each of which carries a plurality of time slots. It should be understood that the TDM bus 22 may be implemented using other types and configurations of buses to establish appropriate communications between the various cards.

A CPU 46, which is preferably a Motorola 68302 microprocessor, interfaces with the HDLC bus 20, as well as read only memory (ROM) 48, random access memory (RAM) 50, timing and control circuitry 52 and, via a synchronized serial communication path 60, with a digital signal processing module (DSPM) 74. A battery 51 provides backup power for RAM 50 so that information stored therein is preserved in the event of an interruption of the primary power supply.

A multiplexer 54 passes information from the bus drivers/receivers 45 to PCM banks 62. Conversely, a multiplexer 56 passes information from the PCM banks 62 to the bus drivers/receivers 45. A time slot counter 66 is connected to the PCM banks 62, as is a control store 64. The control store 64 is also connected to a bus arbiter 70. A PCM bus 73 passes PCM data bidirectionally between the PCM banks 62, a voice recorded announcement module (VRAM) 72 and the DSPM 74.

The VRAM 72 includes electrically erasable programmable read only memory (EEPROM) and battery-backed static RAM circuitry 78 and a digital signal processor (DSP) 76, which is preferably a Texas Instruments TMS320C31, that is connected to the bus arbiter 70. The DSPM includes a total of four DSPs 76.

Other modules which may also be mounted on the DSP card 16 (in lieu of the VRAM 72 or DSPM 74) to provide other types of communications or call processing services are a tone generation module 80, an ADPCM compression module 82 and a voice recognition module 84. Once installed on the DSP card 16, each such module is interfaced with the path 60, the bus arbiter 70 and the PCM bus 73 and each module is controlled by the CPU 46.

The tone generation module 80 may contain, for example, a DSP 76 and programmable read only memory (PROM) for generating "standard" tones in accordance with a desired signalling protocol. Similarly, the ADPCM compression module 82 may contain conventional circuitry for compressing PCM data in accordance with an adaptive differential pulse code modulation (ADPCM) algorithm. The voice recognition module 84 may contain conventional circuitry for recognizing speech from calls handled by the switch 10.

The general operation of the DSP card 16 will now be briefly described with reference to FIGS. 1-3. The CPU 46 has overall control of the other components and modules located on the DSP card 16. The CPU 46 receives messages from and transmits messages to the central call processor 34 (on the CPU/matrix card 12) via the HDLC bus 20. Messages sent from the central call processor 34 to the CPU 46 are typically used to instruct that certain action be performed. Messages sent from the CPU 46 to the central call processor 34 are typically used to report that certain actions have been carried out.

Importantly, the DSP card 16 is always synchronized with the CPU/matrix card 12 by virtue of timing signals received via the timing/control bus 26. Consequently, the PCM banks 62, which are connected to continuously receive (via the TDM bus 22) all PCM data transmitted from the line cards 16 and 18, are always synchronized with TSI 44. Thus, all PCM data transmitted from any of the line cards 16 and 18 is stored simultaneously in corresponding memory locations within the TSI 44 and the PCM banks 62.

Once data is stored in the PCM banks 62, such data may be processed or operated upon by any of the modules located on the DSP card 16. As described further below, such processing may include tone generation or detection, call progress analysis, playback of a recorded announcement, ISDN call control and the like.

The control store 64, as directed by the CPU 46, applies addresses to the PCM banks 62. Each applied address corresponds to a memory location which contains either a predetermined bit pattern or PCM data. In a preferred embodiment of the present invention, the predetermined bit pattern FF (hex) is used. A desired predetermined bit pattern may be selected by an appropriate message issued from the CPU/matrix card 12.

During any given time slot, one and only one of the CPU/matrix card 12, the DSP card 16 and the packet engine card 21 is permitted to transmit PCM data over the TDM bus 22 to the line cards 14 and 18. The selection of which of cards 12, 16 and 21 is permitted to transmit PCM data is controlled through the exchange of messages over the HDLC bus 20.

For a given time slot, if the DSP card 16 is not selected to transmit PCM data, then the control store 64 will apply an address to the PCM banks 62 which corresponds to a memory location containing the predetermined bit pattern. Recalling for a moment that the bus drivers/receivers 45 are preferably of the type having open collector outputs, it will be apparent to those skilled in the art that the predetermined bit pattern (FF) will effectively turn off the drivers/receivers 45. Thus, for the given time slot, the DSP card 16 will have no effect on the TDM bus 22.

Conversely, if the DSP card 16 is selected to transmit PCM data during the given time slot, then the control store 64 will apply an address to the PCM banks 62 which corresponds to the memory location containing the appropriate data. That PCM data will then be transmitted (by the multiplexer 56 and bus drivers/receivers 45) via the TDM bus 22 directly to the port (located on line card 14 or 18) associated with the time slot. Because data stored in the PCM banks 62 is transmitted directly to the ports via TDM bus 22, none of the time slots of the TSI 44 which would otherwise be available for actual calls is occupied by the DSP card 16.

Examples of how the DSP card 16 may be used to perform call processing or other communications services will now be described. With continuing reference to FIGS. 1-3, when the switch 10 is initially powered up (i.e., the PC 2 is turned on), basic configuration information and operational system software must be downloaded from a host before initialization procedures or any call processing operations may commence. The CPU/matrix card 12 knows whether to request a download from the internal host or the external host based on the setting of the host select circuitry 35. After a successful download is completed, the selection of either the internal host or the external host may be made using messages between the host and switch 10.

At this point, the central call processor 34 proceeds to interrogate all other cards present within the switch 10. The processor 34 uses the LC status/control bus 24 or HDLC bus 20 to interrogate all line cards 16 and 18 and to receive responses which indicate to the processor 34 the types and number of line cards present.

Subsequently, the central call processor 34 further interrogates the identified analog line cards 18, again using the LC status/control bus 24. In responding to this further interrogation, the analog line cards 18 identify the types of signalling protocols they support, the number of ports they contain, etc. This information is retained in the memory 36 on the CPU/matrix card 12.

Similarly, the central call processor 34 further interrogates identified digital line cards 14, DSP cards 16 and packet engine cards 21. The processor 34 transmits a message addressed to a particular card via the HDLC bus 20 and the receiving card responds with a message indicating its status and other information such as whether a download of basic instructions is needed. If a download is needed, the central call processor 34 will respond by passing the appropriate information, previously received from the host, via the HDLC bus 20.

Configuration information is preferably initially stored in random access memory 36 on the CPU/matrix card 12. The memory 36 is preferably provided with battery-backup in order to preserve the configuration information and eliminate the need for re-downloading in the future should the switch 10 experience a power loss. The configuration information typically includes basic instructions as to how to control each type of port that the switch 10 may have. Such information also preferably includes synchronization priority information which specifies an order in which the five possible synchronization signals available to the timing and control/select circuitry 42 should be used to synchronize the CPU/matrix card 12.

Once all cards present have been identified and interrogated by the central call processor 34, that processor (using memory 36) constructs a map or table which includes the PCM address range, type of line card and status and type of each port within the switch 10. At this point, the switch 10 is ready to begin normal operation in accordance with messages received by the CPU/matrix card 12 from the host and activity at the ports.

Figure 4:
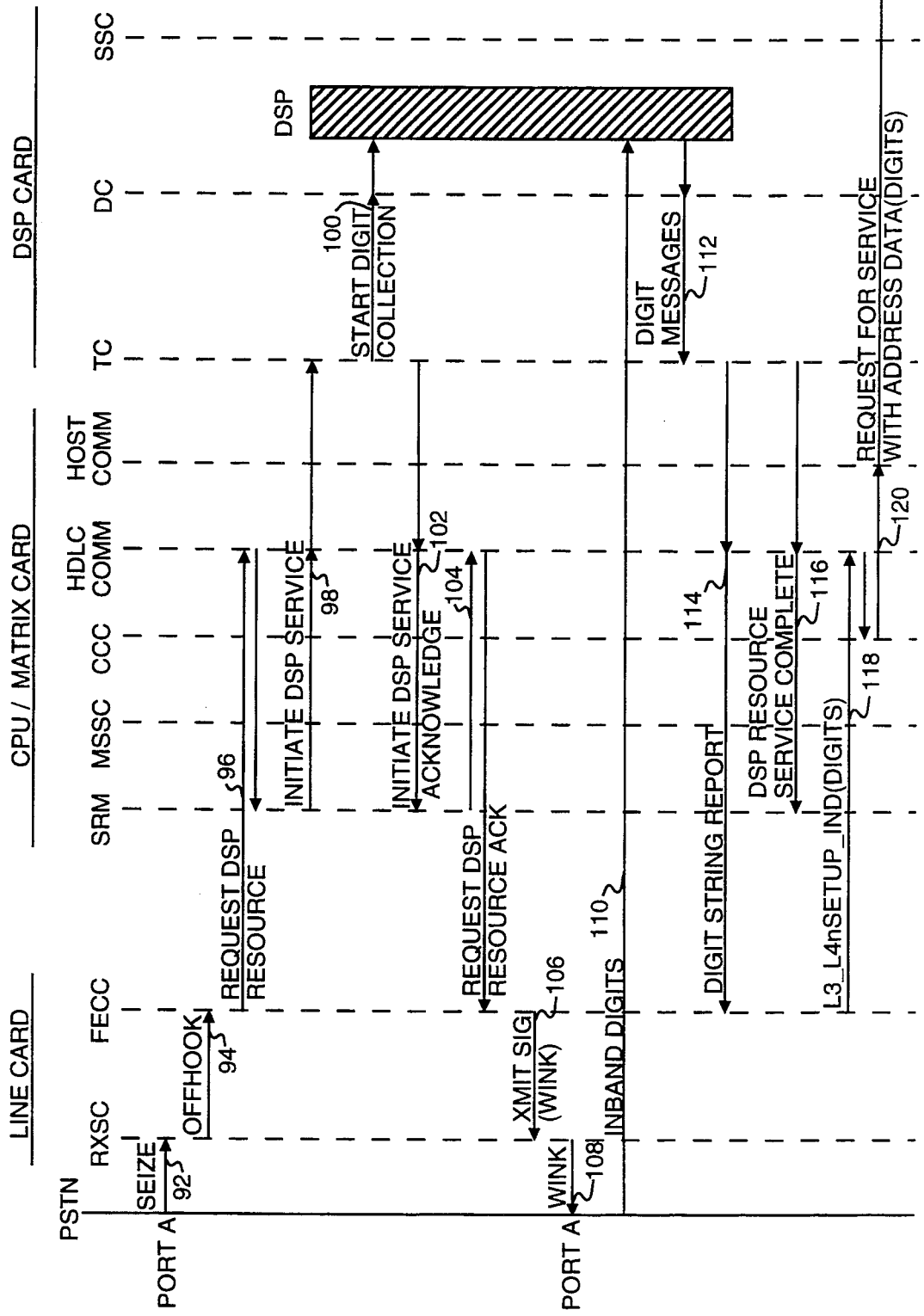
FIG. 4 is a call flow diagram showing the messages generated and tasks performed when the digital signal processing card of FIG. 3 processes an incoming call.

FIG. 4 is a call flow diagram showing a sequence of steps for processing a call using the DSP card 16. In this example, the DSP card 16 performs tone detection for a call originating from the public telephone network (PSTN).

Each of the vertical dashed lines in this figure represents a software process which is identified by an acronym. The full names of the depicted processes are as follows:

| Process Acronym | Process Name |
| --- | --- |
| RXSC | Receive and Transmit Signalling Control |
| FECC | Front End Call Control |
| SRM | System Resource Management |
| MSSC | Master Space Switch Control |
| HDLC Comm | HDLC Communication Control |
| Host Comm | Host Communication Control |
| CCC | Central Call Control |
| TC | Tone Control |
| DC | DSP Control |
| SSC | Space Switch Control |
| PC | PRI ISDN Control |

A label such as "Line Card" or "DSP Card" indicates on which board the process is running. The solid vertical line at left represents the PSTN and the solid vertical line at right represents either the PC CPU 4 or the external host 30 of FIG. 1. Each horizontal arrow represents the transmission of a message between two processes with the function or meaning of that message indicated immediately above the arrow.

As a call originating from the PSTN is received at port A on one of the line cards, a seizure 92 of that port is detected by the RXSC process on the affected line card. The RXSC process responds by informing the FECC process that port A is now offhook 94. The FECC process knows, as a result of receiving basic operating instructions from the CPU/matrix card 12 as described above, that a DSP card 16 is available for processing the incoming call. Thus, the FECC process sends a message to the SRM process, via HDLC Comm process, requesting an appropriate DSP resource 96 from the DSP card 16, which in this example is tone detection.

The SRM process, which maintains a map of various system resources and their availability, responds by sending a message to the TC process (on the DSP card) which is an instruction to initiate DSP service 98. The TC process responds by instructing, via the DC process, an available DSP 76 (FIG. 3) to start digit collection 100 from port A.

The hatched area labeled "DSP" represents the general time period during which the particular DSP 76 which was instructed to collect digits is "listening" to the PCM data appearing on the TDM bus 22 during the time slots which are assigned to port A. As described above, all PCM data originating from the line cards is continuously received and stored in the PCM banks 62 on the DSP card 16, thus rendering such data available to the DSPs 76 via the PCM bus 73. It should be understood that each DSP 76 may be independently programmed in a conventional manner to perform tone detection, tone generation, call progress analysis, etc.

The bus arbiter 70 is responsible for allocating available time among the various DSPs 76 so that each has access to the PCM banks 62. In a preferred embodiment, each DSP 76 is interrupted every 125 microseconds by the bus arbiter 70 and allowed to access the banks 62. Each DSP 76 is required to read PCM data from the banks 62 during each interrupt. The amount of access time allocated to each DSP 76 is programmable through messages sent to the CPU 46 from the CPU/matrix card 12.

The TC process proceeds to transmit, via the HDLC Comm process, to the SRM process an acknowledgement 102 that the instruction to initiate DSP service was executed. The SRM process, in turn, transmits via the HDLC Comm process to the FECC process an acknowledgement 104 that the request for a resource DSP has been answered. The FECC process then instructs the RXSC process to send a transmit signal (wink) 106 on port A, which is performed at 108.

Incoming, inband digits 110 are received from port A and passed via TDM bus 22 to the DSP card 16 where they are collected and analyzed. The DSP 76 issues digit messages 112 as digits are received. The TC process responds by issuing a digit string report 114, via the HDLC Comm process, to the FECC process on the line card. The TC process then issues a message, again via the HDLC Comm process, to inform the SRM process that use of the assigned DSP resource service is complete 116. This permits the SRM process to reassign the DSP resource to another call as needed.

At 118, the FECC process transmits a message (which includes the collected digits), via the HDLC Comm process, to the CCC process. This message is essentially an indication to the CCC process that an incoming call having particular digits associated with it is present. The CCC process responds by transmitting a request for service message 120, which includes the collected digits (address data), to the Host Comm process. As described further below, the Host Comm process responds by creating a new message which is transmitted to the host. Although not shown, an application program running on the host would typically respond with a message to either establish a connection through the TSI 44 on the CPU/matrix card 12 or to take some other appropriate action.

Figure 5:
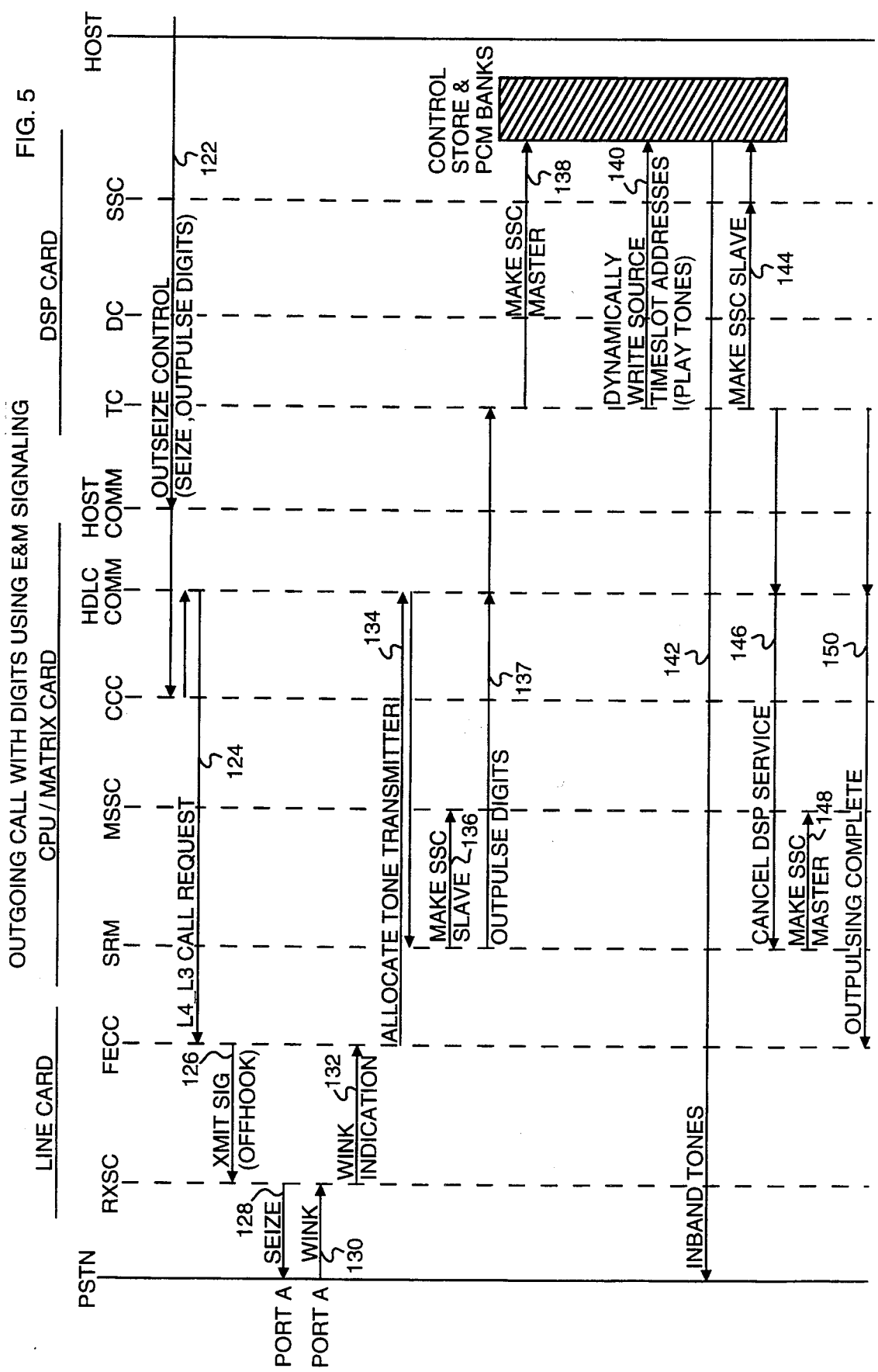
FIG. 5 is a call flow diagram showing the messages generated and tasks performed when the digital signal processing card of FIG. 3 processes an outgoing call.

FIG. 5 is a call flow diagram of an outgoing call in which the DSP card 16 is used to provide tone generation. The host transmits an outseize control message 122 which is received by the Host Comm process. This message is an instruction to seize an available port and outpulse digits which are provided within the message. All messages which are received from or are to be transmitted to the host are handled by the Host Comm process on the CPU/matrix card 12. Messages received by the Host Comm process from the host are handled on the CPU/matrix card 12 and are not transmitted to any of the line cards or communications services cards. Similarly, messages originating from the line cards or communications services cards are handled on the CPU/matrix card 12 and are not transmitted to the host.

In a preferred embodiment, the Host Comm process looks for an identification digit or combination of digits which represent the beginning of a message. The digits FE (hex) are preferably used as the identification digits. Next, the Host Comm process examines the received message to determine if the correct number of bytes have been received, validates the message using a checksum byte that forms part of the message and identifies a message number. The Host Comm process then converts a logical span ID and logical channel specified in the message to a corresponding physical time slot.

The Host Comm process proceeds to create a new message, which does not include either the identification digits nor the logical span ID and logical channel information provided by the host. A buffer is allocated by the operating system running on the CPU/matrix card 12 and relevant information from the host-originated message is copied into the buffer. The new message and buffer are then passed to the CCC process.

The CCC process receives the new message from the Host Comm process and proceeds to validate that message. If the message is valid, the CCC process creates yet another message that is transmitted to the HDLC Comm process, which responds by issuing a call request message 124 to the FECC process on one of the line cards.

The FECC process in turn issues a message to the RXSC process to send a transmit signal (offhook) 126. The RXSC process seizes port A at 128, receives a wink at 130 and reports a wink indication 132 to the FECC process. The FECC process transmits a message to the SRM process, via the HDLC Comm process, requesting allocation of a tone transmitter (generator) 134. The SRM process responds at 136 by transmitting a message to the MSSC process which serves to inform the CPU/matrix card 12 that it should temporarily become a "slave" with respect to the time slot on the TDM bus 22 that correspond to port A. The slave status means that the CPU/matrix card 12 is not supposed to transmit PCM data over the TDM bus 22 during port A's time slot. At 137, the SRM process issues a message to outpulse digits (i.e., a digit string) via the HDLC Comm process to the TC process.

The TC process recognizes that since the CPU/matrix card 12 is now the slave with respect to port A's time slot, the DSP card 16 (specifically, the SSC process on the DSP card 16) must become the "master" with respect to that time slot. That is, the DSP card 16 is now responsible for transmitting PCM data over the TDM bus 22 during port A's time slot. Accordingly, the TC process responds by transmitting a message at 138 which serves to inform both the SSC process and the control store 64 (FIG. 3) of the change in status from slave to master.

This is followed by another message from the TC process at 140 which results in the following series of actions. The control store 64 permits a selected one of the DSPs 76 access to the PCM banks 62. During such access, the selected DSP 76 calculates a PCM value (data) which represents an appropriate tone and stores the value in a memory location in the PCM banks 62 that corresponds to port A's time slot. The control store 64 also points to that memory location in preparation for transmitting the stored data over the TDM bus 22.

At 142, inband tones are transmitted via the TDM bus 22 to the PSTN. This is effected by the control store 64, which applies the appropriate address to the PCM banks 62, thereby resulting in transmission of the stored data (via the multiplexer 56 and bus drivers/receivers 45 to the TDM bus 22) to the PSTN.

Once the tones are played, the TC process transmits a message 144 to change the status of the SSC process from master to slave. As a result of this change in status, the DSP card 16 is no longer permitted to transmit PCM data during the time slot corresponding to port A. Accordingly, beginning with the next occurrence of port A's time slot, the control store 64 applies an address to the PCM banks 62 which corresponds to a memory location that contains the predetermined bit pattern, thereby effectively turning off the bus drivers/receivers 45.

The TC process then transmits a message to the SRM process, via the HDLC Comm process, which is a request to cancel DSP service 146. The SRM process responds by transmitting a message 148 to make the MSSC process (on the CPU/matrix card 12) the master with respect to port A's time slot. At this point, the CPU/matrix card 12 is once again responsible for transmitting PCM data over the TDM bus 22 during the time slot corresponding to port A. The TC process then sends a message to the FECC process, via the HDLC Comm process, indicating that outpulsing of digits is complete 150.

By configuring the DSP card 16 with different combinations of modules, desired combinations of call processing and communications services may be obtained. For example, in FIG. 3, the DSP card 16 is configured with one VRAM 72 and one DSPM 74. As just described, the DSPs 76 within DSPM 74 may be used to provide tone detection and tone generation. The DSPs 76 may also be programmed in a conventional manner to provide call progress analysis, conferencing, voice recognition, voice compression or fax encoding/decoding. The VRAM 72 may be used to playback one or more voice announcements stored in EEPROM/battery-backed static RAM 78 to any port. Playback of such announcements is performed in substantially the same manner as the generation of tones. Similarly, other call processing or communications services may be obtained by configuring the DSP card 16 with desired combinations of modules 72, 74, 80, 82 and 84.

Figure 6:
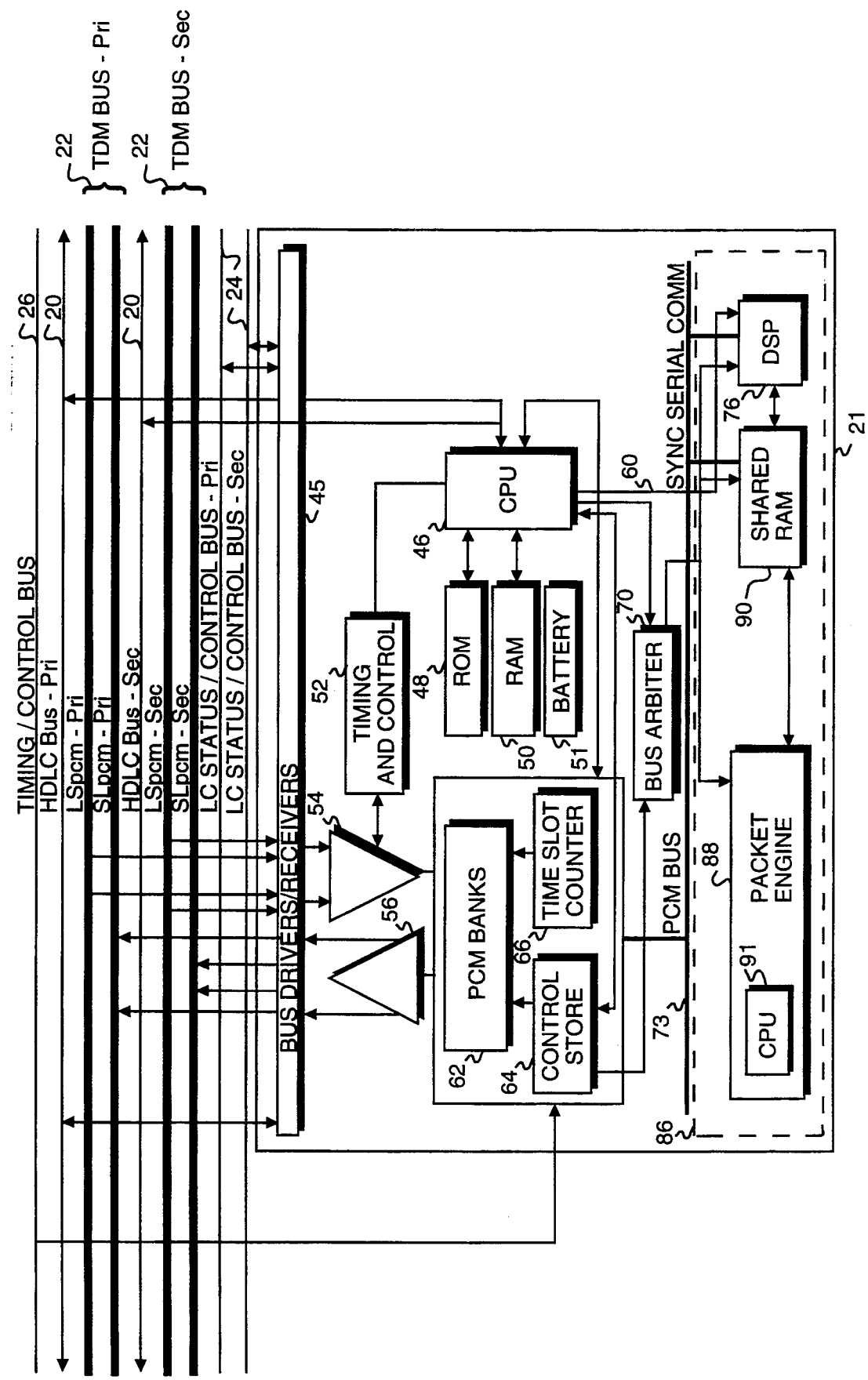
FIG. 6 is a detailed diagram of the packet engine card of FIG. 1.

FIG. 6 shows in greater detail the packet engine card 21 of FIG. 1. The packet engine card 21 interfaces with buses 20, 22, 24 and 26 in a manner that is substantially the same as that described above in connection with the DSP card 16. By virtue of timing signals received via the timing/control bus 26, the packet engine card 21 is always synchronized with the CPU/matrix card 12. Most of the components contained within the packet engine card 21 correspond with components found in the DSP card 16 of FIG. 3 and are used to perform similar functions. For consistency and clarity, such components are denoted by the same reference numbers used in FIG. 3.

An ISDN module (ISDNM) 86 is installed on the packet engine card 21. ISDNM 86 includes one DSP 76, a packet engine 88 and shared random access memory (RAM) 90. The DSP 76 is used to transfer data between the PCM banks 62 and the packet engine 88 and may operate in conjunction with a serial-to-parallel converter (not shown). The packet engine 88 includes a CPU 91, which is preferably a Motorola 68000 microprocessor, and is available from PRI of Salem, N.H.

The packet engine card 21 is architecturally independent from the line cards 14 and 18, which provides several important advantages. First, packet engine services can be provided for multiple line cards using a single packet engine card 21. Second, packet engine services can be added to the switch 10 at any time by installing a packet engine card 21 without necessitating any modification of existing line cards. Third, multiple types of line interfaces (i.e., T1, E1, DS3, RS449, RS-232, etc.) can be served by the same packet engine card 21. Fourth, additional packet engine processing power or redundancy (or both) can be added by simply installing additional packet engine cards 21, again without affecting existing line cards. Lastly, because all ISDN signalling interpretation is done centrally by the packet engine card 21 and there is no interpretation performed by any of the line cards, a given line card may terminate both ISDN Primary Rate circuits as well as inband or channel associated signalling circuits.

The general operation of the packet engine card 21 will now be described. The packet engine card 21 functions as a centralized packet engine which, when programmed in an appropriate fashion, may be used as an ISDN D channel server or to provide packet switching services for ISDN B or D channels, X.25 networks or to provide access to Signalling System 7 features.

As an example, assume that the packet engine card 21 is intended for use as an ISDN D channel server. In conjunction with the initialization procedure discussed above in connection with FIG. 3, the CPU/matrix card 12, using the HDLC bus 20, transmits information to the packet engine card 21 identifying which time slots on the TDM bus 22 correspond with ISDN D channels. The packet engine card 21 becomes the master of the identified time slots and is therefore responsible for transmitting D channels during those slots.

Once the D channel routing is established, call supervision on the B channels is performed using messages transmitted via the HDLC bus 20 between the CPU/matrix card 12 and the packet engine card 21. The packet engine card 21 encodes and decodes ISDN D channel call control messages so that the CPU/matrix card 12 does not have to distinguish between messages originating from packet engine cards 21 and messages originating from other cards.

The packet engine 88 takes messages placed in the shared RAM 90 by the CPU 46, encodes them in accordance with a preselected protocol and transmits the encoded messages to the PCM banks 62. The encoded messages are then transmitted out to the D channels which are mapped to the PCM addresses selected by the DSP 76. Packets arriving from the PCM banks 62 are decoded by the packet engine 88 and loaded into the shared RAM 90. DSP 76 pulls D channel messages from PCM banks 62 which hold data arriving from D channel ports.

FIG. 7 is a call flow diagram showing sequences of steps for processing ISDN Primary Rate calls using the packet engine card 21. At 154, a setup message representing an incoming call is received at port A and recognized by the PC process which is running on the packet engine card. The PC process responds by transmitting a setup message 156 to the FECC process. The FECC process in turn transmits a setup message (with digits) 158 via the HDLC Comm process to the CCC process.

The CCC process responds by transmitting a request for service message 160, via the Host Comm process, to the host. The host issues an outseize control message 162 to the Host Comm process, which in accordance with the procedure described previously, generates a new message that is transmitted to the to the CCC process. In turn, the CCC process transmits a call request message 164 via the HDLC Comm process to the FECC process, which issues a call request message 166 to the PC process. The PC process transmits a call request message 168 to port B.

Port B responds with an alerting message 170 directed to the PC process. The PC process transmits an alerting message 172 to the FECC process, which responds by sending an alerting message 174 to the CCC process via the HDLC Comm process. The FECC process then transmits a host acknowledge message 175 to the HDLC Comm process. The HDLC Comm process validates the received message and creates a new message that is transmitted to the Host Comm process. The Host Comm process then follows a procedure which is the essentially the converse of that previously described in connection with the receipt of a message from the host. That is, the Host Comm process first validates the received message and then converts the physical time slot specified in that message to a logical span ID and logical channel. The Host Comm process then creates a new message, which includes the identification digits and the logical span ID and logical channel information, which is transmitted to the host.

Next, port B sends a connect message 176 to the PC process, which is followed by connect messages 178 and 180. The host then transmits a message 184 to connect ports A and B which is sent to the Host Comm process and handled in the accordance with the procedure previously described. The Host Comm process creates a new message which is sent to the CCC process. The CCC process then issues a connect message 186 to the MSSC process followed by a connect acknowledge message 188 to the Host Comm process, which creates a new message that is transmitted to the host.

The CCC process then transmits via the HDLC Comm process an alerting message 190 to the FECC process. The FECC process responds by sending an alerting message to the PC process, which in turn sends an alerting message 194 to port A. The CCC process transmits via the HDLC Comm process a connect message 196 to the FECC process, which in turn transmits a connect message to the PC process. Lastly, a connect message 200 is sent by the PC process to port A.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A programmable communications switch comprising:

controllable-switching means for dynamically connecting or disconnecting communication paths between various ones of a plurality of ports in response to messages generated by a host, including a time slot interchange for switching a plurality of time slots corresponding to said ports and means for processing said messages;

one or more means connected in communicating relationship with said switching means for terminating either analog or digital lines or trunks which represent said ports, said communicating relationship including a bus for carrying time division multiplex TDM data; and one or more programmable means connected in communicating relationship with said switching means and said one or more terminating means for providing programmable communications services to said ports in response to messages generated by said processing means, each of said programmable means being operable to receive TDM data via said data bus from said terminating means during all of said time slots and to transmit TDM data via said data bus to said terminating means during preselected ones of said time slots, whereby said communications services are provided without switching the TDM data received or transmitted by the programmable means through said time slot interchange.

2. The switch as in claim 1 wherein one or more of said programmable means includes one or more digital signal processing means for providing tone generation, tone reception or call progress analysis with respect to said ports.

3. The switch as in claim 2 wherein said one or more of said digital signal processing means is programmed to generate continuous tones.

4. The switch as in claim 2 wherein said one or more of said digital signal processing means is programmed to generate cadenced tones.

5. The switch as in claim 2 wherein said one or more of said digital signal processing means is programmed to generate synchronized tones.

6. The switch as in claim 1 wherein one or more of said programmable means includes means for storing one or more announcements for playback to said ports.

7. The switch as in claim 6 wherein said announcements are downloaded from said host to said means for storing.

8. The switch as in claim 6 wherein said means for storing stores one or more continuous voice messages.

9. The switch as in claim 6 wherein said means for storing stores one or more synchronized voice messages.

10. The switch as in claim 1 wherein said programmable means includes a centralized packet engine for processing packetized information received from one or more of said ports.

11. The switch as in claim 10 wherein said centralized packet engine functions as an ISDN D channel server.

12. The switch as in claim 1 wherein said message processing means is responsive to said messages from said host for dynamically allocating preselected communications services on a port-by-port basis.

13. A programmable communications switch comprising:
controllable-switching means for dynamically connecting or disconnecting communication paths between various ones of a plurality of ports in response to messages generated by a host, including a time slot interchange for switching a plurality of time slots corresponding to said ports and means for processing said messages;
one or more means connected in communicating relationship with said switching means for terminating either analog or digital lines or trunks which represent said ports, said communicating relationship including a bus for carrying time division multiplex TDM data; and
one or more programmable means connected in communicating relationship with said switching means and said one or more terminating means for providing programmable communications services to said ports in response to messages generated by said processing means, one or more of said programmable means including one or more digital signal processing means for providing said communications services to said ports, each of said programmable means being operable to receive TDM data via said data bus from said terminating means during all of said time slots and to transmit TDM data via said data bus to said terminating means during preselected ones of said time slots, whereby said communications services are provided without switching the TDM data received or transmitted by the programmable means through said time slot interchange.

14. The switch as in claim 13 wherein one or more of said digital signal processing means is programmed to provide tone generation with respect to said ports.

15. The switch as in claim 13 wherein one or more of said digital signal processing means is programmed to provide tone reception with respect to said ports.

16. The switch as in claim 13 wherein one or more of said digital signal processing means is programmed to provide call progress analysis with respect to said ports.

17. A programmable communications switch comprising:
controllable-switching means for dynamically connecting or disconnecting communication paths between various ones of a plurality of ports in response to messages generated by a host, including a time slot interchange for switching a plurality of time slots corresponding to said ports and means for processing said messages;
one or more means connected in communicating relationship with said switching means for terminating either analog or digital lines or trunks which represent said ports, said communicating relationship including a bus for carrying time division multiplex TDM data; and
one or more programmable means connected in communicating relationship with said switching means and said one or more terminating means for providing programmable communications services to said ports in response to messages generated by said processing means, one or more of said programmable means including a packet engine for providing packet communications services to said ports, each of said programmable means being operable to receive TDM data via said data bus from said terminating means during all of said time slots and to transmit TDM data via said data bus to said terminating means during preselected ones of said time slots, whereby said communications services are provided without switching the TDM data received or transmitted by the programmable means through said time slot interchange.

18. A programmable communications switch comprising:
controllable-switching means for dynamically connecting or disconnecting communication paths between various ones of a plurality of ports in response to messages generated by a host, including a time slot interchange for switching a plurality of time slots corresponding to said ports and means for processing said messages;
one or more means connected in communicating relationship with said switching means for terminating either analog or digital lines or trunks which represent said ports, said communicating relationship including a bus for carrying time division multiplex TDM data; and
one or more programmable means connected in communicating relationship with said switching means and said one or more terminating means for providing communications services to said ports in response to messages generated by said processing means, one or more of said programmable means including means for storing one or more voice recorded announcements for playback to any of said ports, each of said programmable means being operable to receive TDM data via said data bus from said terminating means during all of said time slots and to transmit TDM data via said data bus to said terminating means during preselected ones of said time slots, whereby said communications services are provided without switching the TDM data received or transmitted by the programmable means through said time slot interchange.

19. The switch as in claim 18 wherein said storing means comprises a digital signal processing means and an electrically erasable programmable read only memory.

20. A programmable communications switch comprising:
controllable-switching means for dynamically connecting or disconnecting communication paths between various ones of a plurality of ports in response to messages generated by a host, including a time slot interchange for switching a plurality of time slots corresponding to said ports and means for processing said messages;
one or more means connected in communicating relationship with said switching means for terminating either analog or digital lines or trunks which represent said ports, said communicating relationship including a bus for carrying time division multiplex TDM data; and one or more programmable means connected in communicating relationship with said switching means and said one or more terminating means for providing programmable communications services to said ports in response to messages generated by said processing means, each of said programmable means having substantially direct access to receive TDM data originating from each of said ports and to transmit TDM data to preselected ones of said ports, whereby said communications services may be dynamically provided on a port-by-port basis.

21. The switch as in claim 20 wherein one or more of said programmable means includes one or more digital signal processing means for providing tone generation, tone reception or call progress analysis with respect to said ports.

22. The switch as in claim 21 wherein said one or more of said digital signal processing means is programmed to generate continuous tones.

23. The switch as in claim 21 wherein said one or more of said digital signal processing means is programmed to generate cadenced tones.

24. The switch as in claim 21 wherein said one or more of said digital signal processing means is programmed to generate synchronized tones.

25. The switch as in claim 20 wherein one or more of said programmable means includes means for storing one or more announcements for playback to said ports.

26. The switch as in claim 25 wherein said announcements are downloaded from said host to said means for storing.

27. The switch as in claim 25 wherein said means for storing stores one or more continuous voice messages.

28. The switch as in claim 25 wherein said means for storing stores one or more synchronized voice messages.

29. The switch as in claim 20 wherein said programmable means includes a centralized packet engine for processing packetized information received from one or more of said ports.

30. The switch as in claim 29 wherein said centralized packet engine functions as an ISDN D channel server.

31. Apparatus for providing programmable communications services in a programmable communications switch comprising controllable-switching means for dynamically connecting or disconnecting communication paths between various ones of a plurality of ports in response to messages generated by a host, including a time slot interchange for switching a plurality of time slots corresponding to said ports and means for processing said messages, and one or more means connected in communicating relationship with said switching means for terminating either analog or digital lines or trunks which represent said ports, said communicating relationship including a bus for carrying time division multiplex TDM data, said apparatus comprising:

one or more programmable means connected in communicating relationship with said switching means and said one or more terminating means for providing programmable communications services to said ports in response to messages generated by said processing means, each of said programmable means being operable to receive TDM data via said data bus from said terminating means during all of said time slots and to transmit TDM data via said data bus to said terminating means during preselected ones of said time slots, whereby said communications services are provided without switching the TDM data received or transmitted by the programmable means through said time slot interchange.

32. The apparatus as in claim 31 wherein one or more of said programmable means includes one or more digital signal processing means for providing tone generation, tone reception or call progress analysis with respect to said ports.

33. The apparatus as in claim 32 wherein said one or more of said digital signal processing means is programmed to generate continuous tones.

34. The apparatus as in claim 32 wherein said one or more of said digital signal processing means is programmed to generate cadenced tones.

35. The apparatus as in claim 32 wherein said one or more of said digital signal processing means is programmed to generate synchronized tones.

36. The apparatus as in claim 31 wherein one or more of said programmable means includes means for storing one or more announcements for playback to said ports.

37. The apparatus as in claim 36 wherein said announcements are downloaded from said host to said means for storing.

38. The apparatus as in claim 36 wherein said means for storing stores one or more continuous voice messages.

39. The apparatus as in claim 36 wherein said means for storing stores one or more synchronized voice messages.

40. The apparatus as in claim 31 wherein said programmable means includes a centralized packet engine for processing packetized information received from one or more of said ports.

41. The apparatus as in claim 40 wherein said centralized packet engine functions as an ISDN D channel server.

42. Apparatus for providing programmable communications services in a programmable communications switch comprising controllable-switching means for dynamically connecting or disconnecting communication paths between various ones of a plurality of ports in response to messages generated by a host, including a time slot interchange for switching a plurality of time slots corresponding to said ports and means for processing said messages, and one or more means connected in communicating relationship with said switching means for terminating either analog or digital lines or trunks which represent said ports, said communicating relationship including a bus for carrying time division multiplex TDM data, said apparatus comprising:

one or more programmable means connected in communicating relationship with said switching means and said one or more terminating means for providing programmable communications services to said ports in response to messages generated by said processing means, one or more of said programmable means including one or more digital signal processing means for providing said communications services to said ports, each of said programmable means being operable to receive TDM data via said data bus from said terminating means during all of said time slots and to transmit TDM data via said data bus to said terminating means during preselected ones of said time slots, whereby said communications services are provided without switching the TDM data received or transmitted by the programmable means through said time slot interchange.

43. Apparatus for providing programmable communications services in a programmable communications switch comprising controllable-switching means for dynamically connecting or disconnecting communication paths between various ones of a plurality of ports in response to messages generated by a host, including a time slot interchange for switching a plurality of time slots corresponding to said ports and means for processing said messages, and one or more means connected in communicating relationship with said switching means for terminating either analog or digital lines or trunks which represent said ports, said communicating relationship including a bus for carrying time division multiplex TDM data, said apparatus comprising:

one or more programmable means connected in communicating relationship with said switching means and said one or more terminating means for providing programmable communications services to said ports in response to messages generated by said processing means, one or more of said programmable means including a packet engine for providing packet communications services to said ports, each of said programmable means being operable to receive TDM data via said data bus from said terminating means during all of said time slots and to transmit TDM data via said data bus to said terminating means during preselected ones of said time slots, whereby said communications services are provided without switching the TDM data received or transmitted by the programmable means through said time slot interchange.

44. Apparatus for providing programmable communications services in a programmable communications switch comprising controllable-switching means for dynamically connecting or disconnecting communication paths between various ones of a plurality of ports in response to messages generated by a host, including a time slot interchange for switching a plurality of time slots corresponding to said ports and means for processing said messages, and one or more means connected in communicating relationship with said switching means for terminating either analog or digital lines or trunks which represent said ports, said communicating relationship including a bus for carrying time division multiplex TDM data, said apparatus comprising:

one or more programmable means connected in communicating relationship with said switching means and said one or more terminating means for providing communications services to said ports in response to messages generated by said processing means, one or more of said programmable means including means for storing one or more voice recorded announcements for playback to any of said ports, each of said programmable means being operable to receive TDM data via said data bus from said terminating means during all of said time slots and to transmit TDM data via said data bus to said terminating means during preselected ones of said time slots, whereby said communications services are provided without switching the TDM data received or transmitted by the programmable means through said time slot interchange.

45. Apparatus for providing programmable communications services in a programmable communications switch comprising controllable-switching means for dynamically connecting or disconnecting communication paths between various ones of a plurality of ports in response to messages generated by a host, including a time slot interchange for switching a plurality of time slots corresponding to said ports and means for processing said messages, and one or more means connected in communicating relationship with said switching means for terminating either analog or digital lines or trunks which represent said ports, said communicating relationship including a bus for carrying time division multiplex TDM data, said apparatus comprising:

one or more programmable means connected in communicating relationship with said switching means and said one or more terminating means for providing programmable communications services to said ports in response to messages generated by said processing means, each of said programmable means having substantially direct access to receive TDM data originating from each of said ports and to transmit TDM data to preselected ones of said ports, whereby said communications services may be dynamically provided on a port-by-port basis.

* * * * *